May 3, 1927.

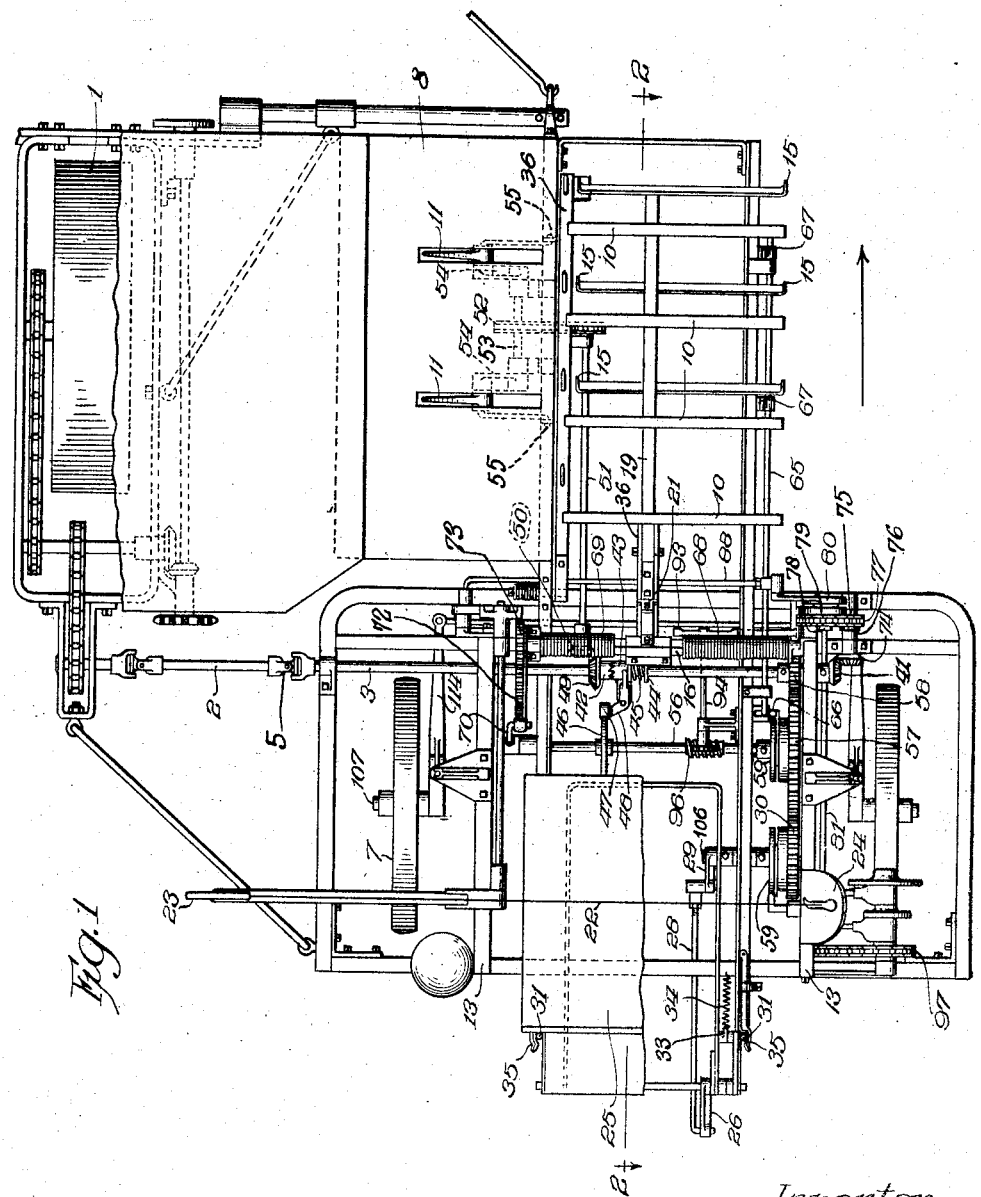

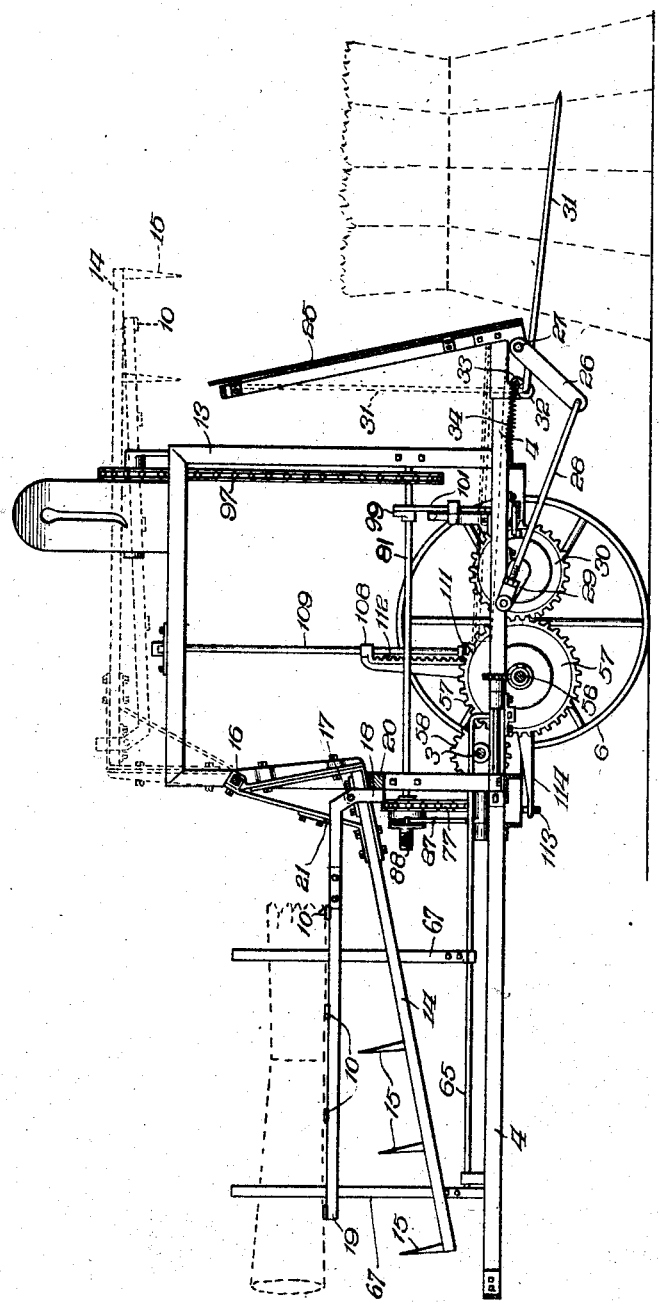

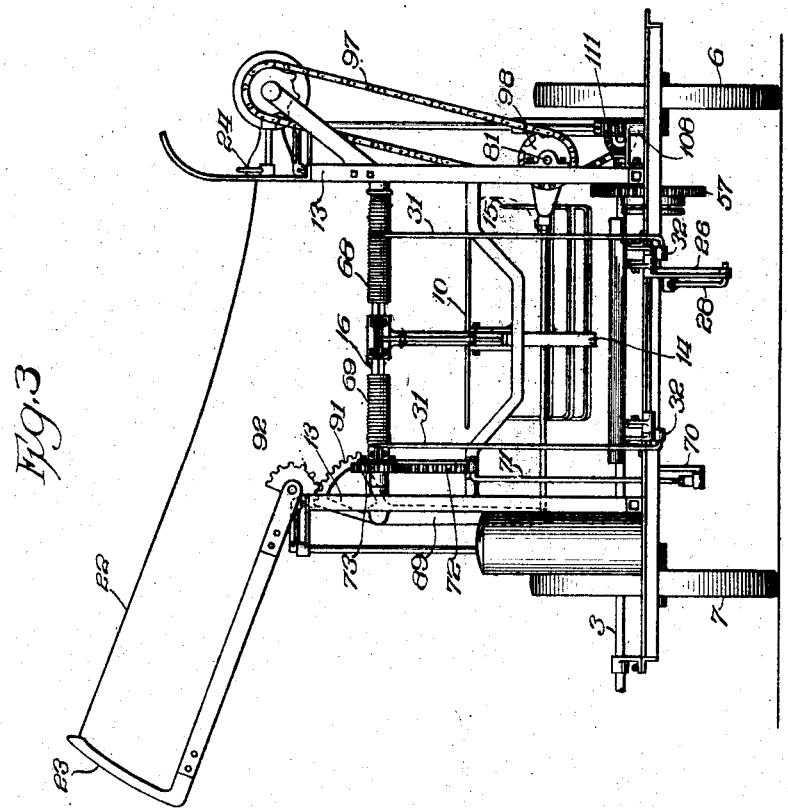

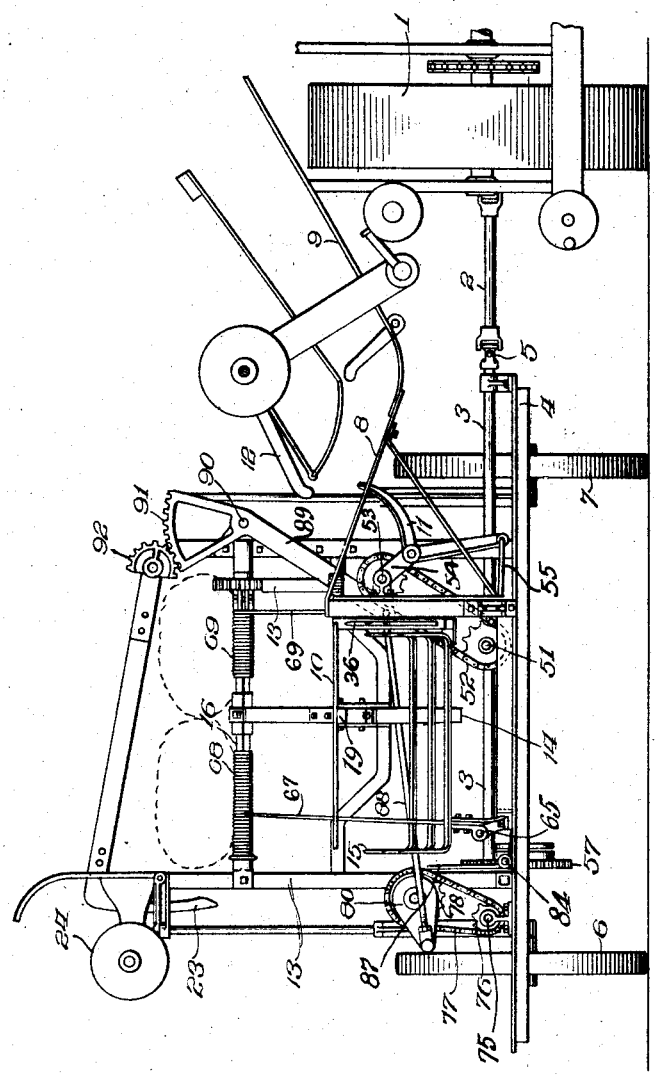

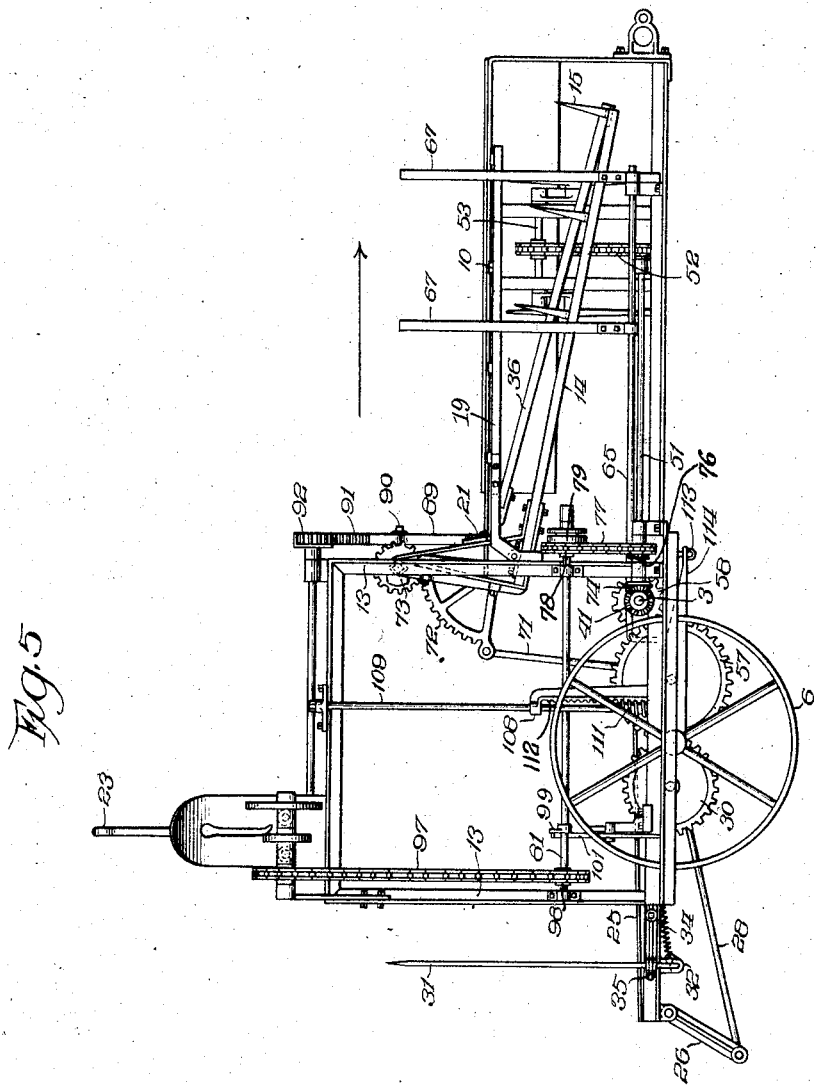

C. C. KELLOGG 1,626,612

GRAIN SHOCKER

Filed May 8, 1919

9 Sheets-Sheet 6

Inventor:
Carlton C. Kellogg

May 3, 1927.
C. C. KELLOGG
GRAIN SHOCKER
Filed May 8, 1919
1,626,612
9 Sheets-Sheet 7
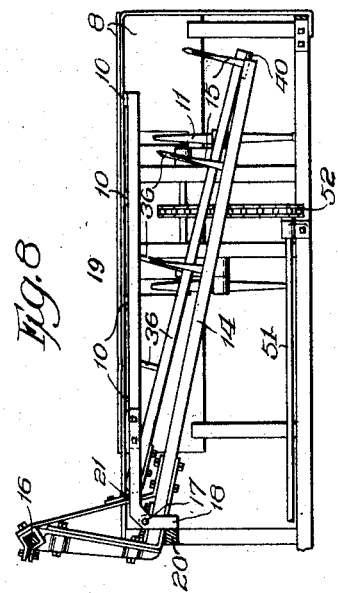
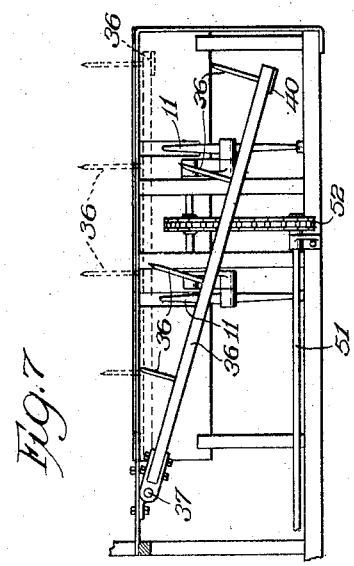
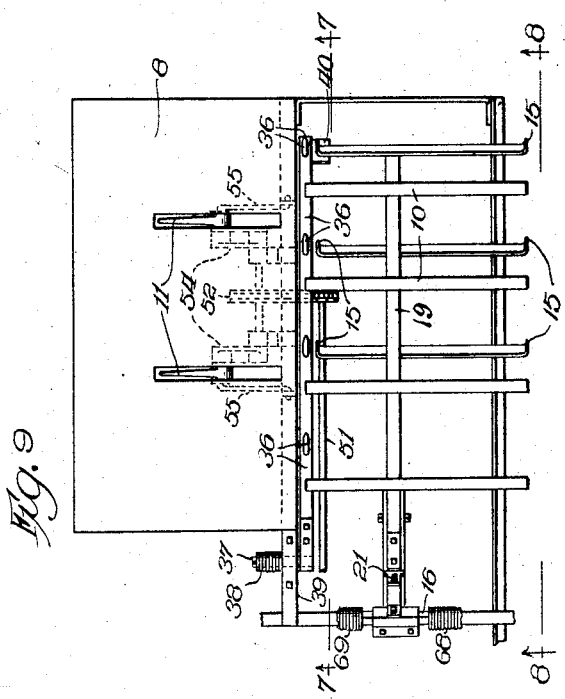
Inventor:
Carlton C. Kellogg

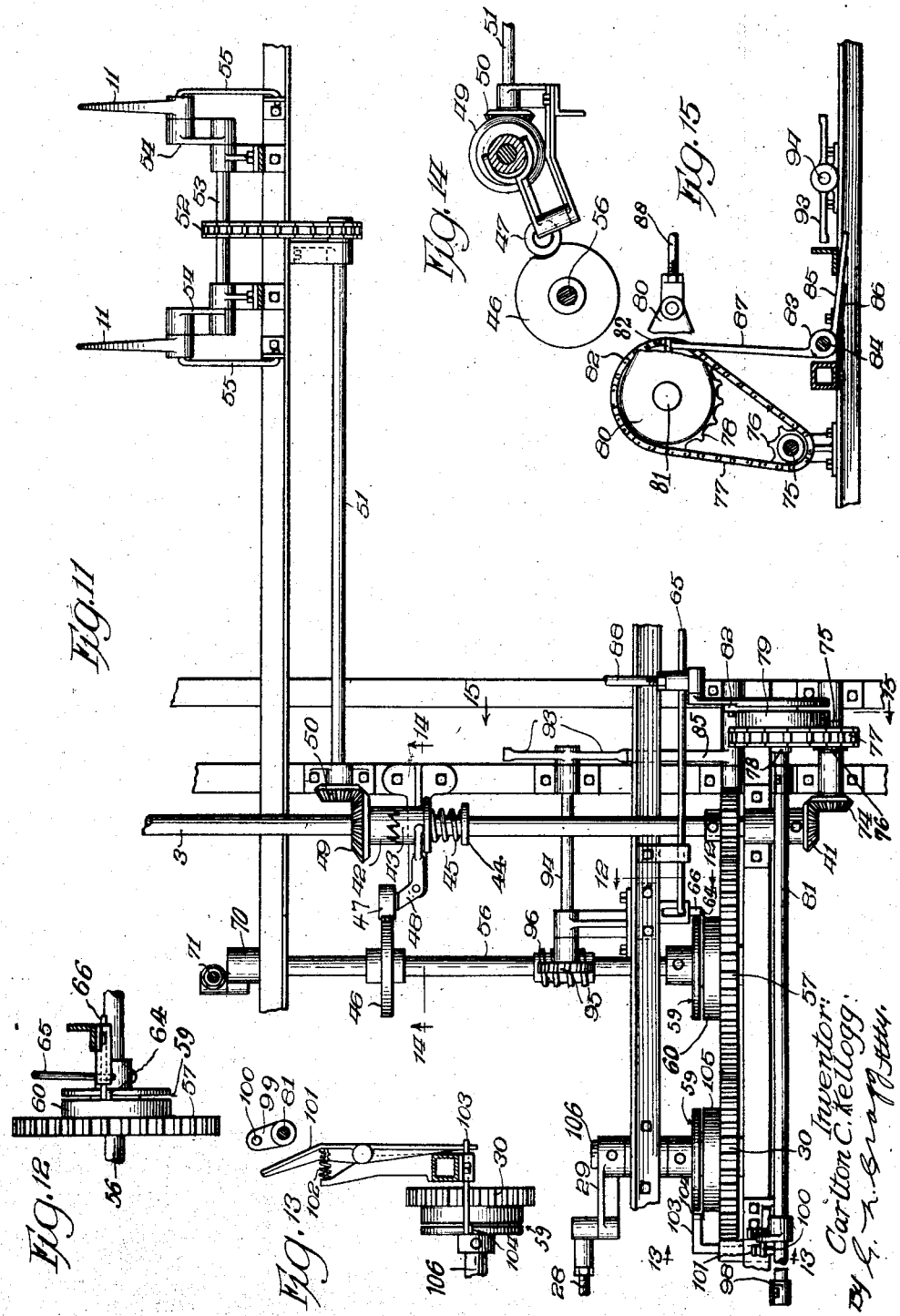

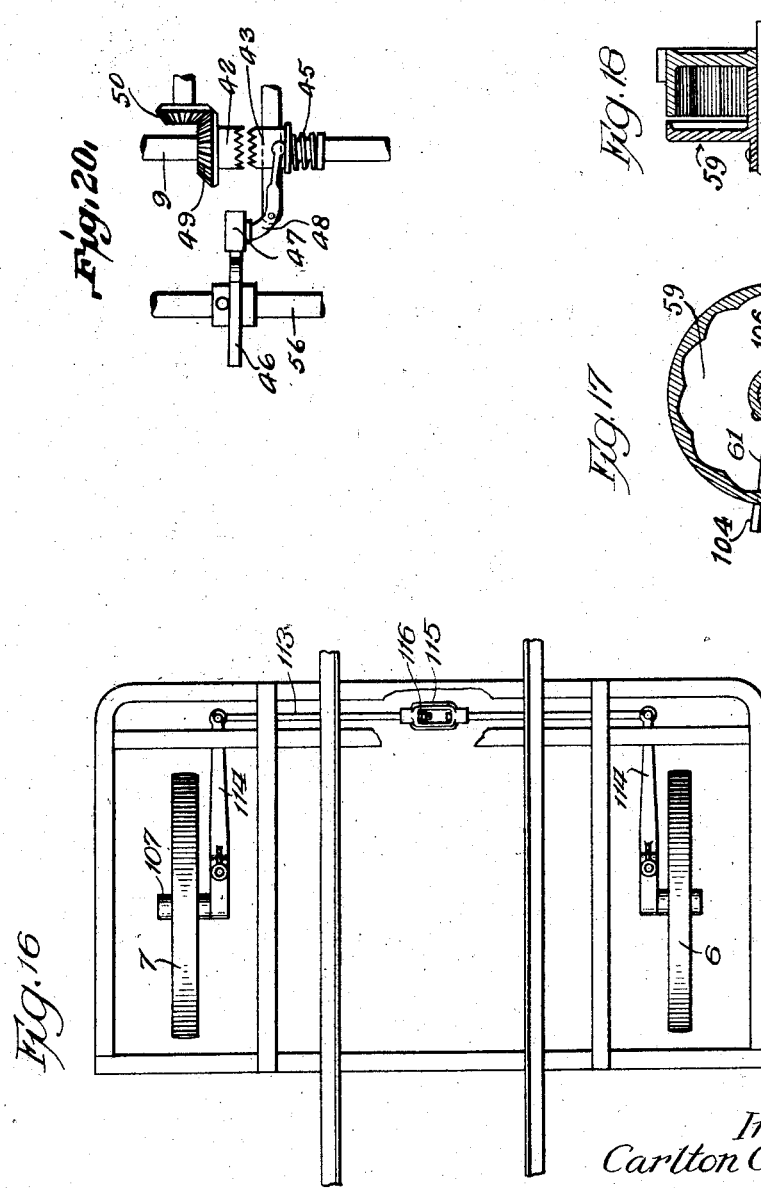

Patented May 3, 1927.

1,626,612

UNITED STATES PATENT OFFICE.

CARLTON C. KELLOGG, OF MOLINE, ILLINOIS.

GRAIN SHOCKER.

Application filed May 8, 1919. Serial No. 295,730.

My invention relates to harvesting machinery and more particularly to shockers which are included in operative association with harvesters to bind bundles of grain delivered from the harvesters into shocks which are discharged from the shockers upon the ground.

In accordance with one feature of my invention, the shocker has a deck for receiving the bundles of grain from the binder deck of the harvester, there being a pronged structure for engaging grain upon said receiving deck but normally located out of the range of movement of the grain passing to said receiving deck. When the receiving deck has received its due load of grain, one or more and preferably two bundles, the pronged structure is moved into the grain, preferably by being moved with relation to the receiving deck, to hold the grain in relation to the receiving deck while the receiving deck is being moved to a position in which the grain may be discharged therefrom. The discharged bundles of grain are received in a receptacle in number equal to that which is to be included in a shock, whereupon the bundles are bound into a shock that is thereafter discharged from the shocker. By providing a pronged structure in such relation to the receiving deck as above described, the receiving deck is free to permit the loading movement of the bundles thereon without interference from the prongs which are only brought into service when the deck is loaded.

In accordance with another feature of my invention mechanism is provided between the binder deck of the harvester and the parts that ordinarily comprise the shocker, to positively move the bundles discharged by the binder mechanism into the path of the bundle shifting pronged structure or bundle delivery arm of the shocker, and this intermediate mechanism acts to store bundles discharged by the binder while the pronged structure of the shocker is in motion, the pronged structure of the shocker and the intermediate mechanism being operated in timed relation so that the intermediate mechanism is at rest when the pronged structure of the shocker is in motion.

In accordance with another feature of my invention a gate is interposed between the binder deck and the receiving deck of the shocker, said gate being in lowered position when the receiving deck is being loaded and being in elevated position when grain discharging movement is imparted to the receiving deck so that grain may not be pushed from the binder deck to the ground when the receiving deck is not in grain receiving position. By means of the gate, also, no grain may be forced into the path being traversed by the parts that carry the bundles to the bundle receptacle.

My invention has other characteristics and will be fully explained in connection with the accompanying drawings showing the preferred embodiment thereof and in which Fig. 1 is a plan view of a machine made in accordance with the preferred embodiment of the invention; Fig. 2 is a sectional view on line 2—2 of Fig. 1; Fig. 3 is a rear end elevation of the shocker; Fig. 4 is a front end elevation of the shocker showing a number of bundles in the bundle receptacle in position to be tied into a shock; Fig. 5 is a side elevation of the shocker taken from the side opposite that from which Fig. 2 is taken; Fig. 6 is a side elevation of the shocker taken in an opposite direction from that in which Fig. 5 is taken; Fig. 7 is a detail view illustrating a gate structure between the binder and shocker decks, this figure being taken on line 7—7 of Fig. 9; Fig. 8 illustrates parts appearing in Fig. 7 and other parts in addition, this figure being taken on line 8—8 of Fig. 9; Fig. 9 is a plan view showing mechanism illustrated in Figs. 7 and 8; Fig. 10 is a detail view illustrating the mechanism of the shocker that operates upon the bundles to be passed from the binder deck to the shocker deck; Fig. 11 is a plan view showing some of the motion transmitting mechanism and the governing mechanism of the shocker parts, further illustration of parts of this mechanism being omitted for the sake of clearness; Fig. 12 is a view in elevation of the clutch mechanism that governs the operation of the structure which holds the prongs in relation to the receiving deck of the shocker while the grain is being transferred; Fig. 13 shows a clutch generally similar to that shown in Fig. 17, the clutch of this figure controlling dumping of the completed shock upon the ground; Fig. 14 is a sectional view on line 14—14 of Fig. 11; Fig. 15 is a view on line 15—15 of Fig. 11; Fig. 16 is a detail plan view showing a trailing wheel structure of the shocker having means for permitting their planes of rotation to change independently of each other either on rough ground or in turning sharp angles; Fig. 17 is a view illustrating a form of clutch which I preferably employ, this view being taken on line 17—17 of Fig. 19; Fig. 18 is a view on line 18—18 of Fig. 17; Fig. 19 is an edge view of the clutch structure illustrated in Figs. 17 and 18; and Fig. 20 is a detail view of some of the cam and clutch mechanism that is preferably employed.

Like parts are indicated by similar characters of reference throughout the different figures.

The bull wheel 1 of the harvester furnishes the power by which the machinery is driven through familiar gearing which need not be described, this bull wheel driving a shaft 2 which furnishes the power for operating the mechanism of the shocker. A shaft 3 is journaled upon the frame 4 of the vehicle which is a part of the shocker structure, this shaft being coupled with the shaft 2 by a universal joint 5. The frame 4 is mounted upon two vehicle wheels 6, 7 and in turn supports all of the shocker operating mechanism and also carries the supplement 8 to the binder deck 9 of the harvester, the normal length of the binder deck being insufficient to reach the bundle receiving deck 10 of the shocker.

By mechanism of the shocker more fully hereinafter to be set forth, the arms 11 of a shocker operated arm structure operate to continue the outward or stubbleward movement of the bundles initially imparted thereto by the arms 12. This operation of the arms 11 is interrupted when the receiving deck is given its discharging movement to prevent said arms from locating any grain in the return path of the receiving deck. The bundles are discharged in succession upon the receiving deck 10 of the shocker, there being desirably two bundles upon such receiving deck before they are transferred to the receptacle 13 in which the bundles are accumulated for the formation of a shock. A bundle shifting pronged structure 14, having prongs 15 thereon, is disposed below the receiving deck 10 when this deck is in bundle receiving position, the prongs then being located out of or below the range of movement of the grain passing to the receiving deck. The portion of the pronged structure upon which the prongs 15 are disposed is in the form of an angular arm mounted upon the shaft 16 upon a frame portion of the machine. The pronged element and the receiving deck are in swinging connection one with the other as indicated at 17. In the construction shown the pronged structure is itself directly mounted to swing upon the frame of the machine and the receiving deck is mounted to turn upon the pronged structure, being thus indirectly mounted to turn at the same place where the prong structure is mounted. When the receiving deck is in grain receiving position the downward extension 18 of the central supporting member 19 thereof engages the strut 20 of the frame which holds the receiving deck in horizontal position and substantially on the same level with the discharge end of the binder deck supplement 8. When the quota, say two, of bundles of grain has been loaded upon the receiving deck the arm 14 of the pronged structure is given a clockwise movement (Fig. 2), the first result being to project the prongs 15 into the grain that is upon the receiving deck. Continued movement of the arm 14 of the pronged structure will bring this arm into engagement with the receiving deck which, thereafter, accompanies the pronged structure in its movement, the prongs 15 preventing displacement of the bundles that are upon the receiving deck. The movement of the receiving deck and the pronged structure is toward the rear and does not cease until these elements are placed in the inverted position shown by the dotted lines in the upper part of Fig. 2. This inverted position happens to be substantially horizontal but I do not wish to be limited to the extent to which the receiving deck and pronged structure are inverted as I consider it to be within the scope of my invention to place these elements in any position to enable the grain to descend therefrom. The deck and pronged structure are swung forwardly to the normal position illustrated in full lines in Fig. 2 after the bundles have been discharged therefrom. Return movement of the pronged structure is positive and is initiated before the return movement of the receiving deck. After the pronged structure has proceeded through a small degree of its returning movement the lug 21 thereon engages the receiving deck and forces it to follow. If the bundles should be reluctant to leave the prongs 15 when the prong structure and receiving deck are in discharge position the receiving deck will operate to strip the bundles from the prongs during the initial return movement of the pronged structure and before the pronged structure picks up the receiving deck by the engagement of the lug 21 on the pronged structure with the receiving deck.

Referring particularly to Fig. 3, when the first bundles for forming a new shock are discharged from the receiving deck of the shocker they serve to depress the twine 22 that extends transversely of the bundles. When the necessary number of bundles have been piled upon the twine to form a shock the shocker needle 23 descends and carries the twine to the knotting mechanism generally illustrated at 24 where the ends of the twine are knotted together to maintain the assembly of the bundles of the shock. The shock is formed in prostrate position upon the section 25 of the bundle receiving receptacle, this section being hinged at its rear end to the rear end of the horizontal frame 4 of the shocker. When the bundles of a shock have been tied together the bottom section 25 is swung to the rear to discharge the shock upright butt end upon the ground. The mechanism for imparting the shock discharging movement to the bottom section 25 includes the arm 26 in fixed relation to the bottom section 25 and mounted to turn therewith upon the shaft 27. A pitman 28 connects the arm 26 with the crank 29 that turns with the spur gear 30 through the intermediation of a timed clutch later to be set forth.

The spur gear 30 is timed to operate when the bundles of a shock have been tied together so that the bottom section 25 may be immediately tilted to the rear to discharge the shock upon the ground. Prongs 31 are desirably employed, these being in upright position when the bundles are discharged from the receiving deck in order to pierce such bundles at their butt ends to prevent lateral displacement thereof and endwise movement. In order that these prongs may permit the shocks to be discharged each has a transverse angular portion mounted in a bearing 32 upon the frame portion 4 of the machine. An arm 33 is fixed upon each transverse portion of the prongs 31 and is transverse to such transverse portion. A coiled spring 34 connects each arm 33 with the main frame 4 of the shocker. When the prongs are upright they are latched by the spring pressed latches 35 that hold them in position. When a shock is discharged it carries the prongs 31 rearwardly with it until these prongs occupy the position illustrated in full lines in Fig. 2. The latches 35 will yield to permit this rearward swinging movement of said prongs. As the shocker travels forwardly the prongs will be withdrawn and when they clear the shock the springs 34 will swing the prongs upwardly and carry them into holding engagement with the latches 35.

I desirably interpose a gate 36 between the discharge edge of the binder deck supplement 8 and the receiving edge of the receiving deck 10. This gate is mounted to swing upon a shaft 37. A spring 38 is anchored at one end to this shaft and at the other end to the frame part 39, the spring exerting counter-clockwise torque upon the gate as this gate is viewed in Figs. 7 and 8 whereby, when the spring is free to act, the gate will be raised above the level of the discharge end of the binder deck supplement to prevent the discharge of grain from this binder deck after the discharge movement of the receiving deck 10 has commenced, the gate being preserved in this location until the receiving deck returns to normal position. In returning to normal position the bar 14 of the pronged structure will press upon the foot 40 to depress the gate out of the path of the grain moving from the binder deck to the receiving deck of the shocker, the movement of the bundle feeding arms 11 being resumed when the pronged structure and receiving deck come to their normal lower position.

The invention is not to be limited to any particular mechanism for producing the movements which have been thus far described, but the mechanism illustrated is preferred. The motions, of course, are initiated from the bull wheel which drives the tumbler shaft 2 that is between the shocker and the harvester and the shaft 3 which is upon the main frame 4 of the shocker. The shaft 3 is continuous from the universal joint 5 to its termination where it supports the bevelled gear 41. A clutch is upon an intermediate portion of the shaft, the member 42 of this clutch being loose upon the shaft. The complemental clutch member 43 turns with the shaft 3 but is movable longitudinally thereon. A collar 44 is fixed on the shaft, a spring 45 being interposed between this collar and the clutch member 43 whose tendency is to maintain the clutch member 43 in engagement with the clutch member 42. A cam disc 46 engages the cam roller 47 upon a bell crank 48. This cam disc has a depression which permits the spring 45 to engage the clutch member 43 with the clutch member 42, the clutch member 43 being separated from the clutch member 42 when the cam roller is not in said depression. The mechanism for effecting and controlling the operation of the cam disc will later be set forth. Whenever the clutch members are coupled the bevelled gear 49 fixed upon the clutch member 42 will turn the bevelled gear 50 fixed upon the shaft 51 and cause the travel of the sprocket chain 52 which in turn will cause the rotation of the shaft 53 on which the crank arms 54 are fixed. The bundle engaging arm structure 11 is pivoted at the outer ends of the arms 54. Links 55 connect the lower ends of the arms 11 with the frame of the shocker. The upper ends of the arms 11 are thus given elliptical paths of movement. Due to the timed operation of the cam disc 46 the clutch members 42 and 43 are coupled when the receiving deck 10 of the shocker is restored to bundle receiving position and are uncoupled when said receiving deck is in movement toward and from its bundle receiving position. The cam disc 46 is fixed upon a shaft 56 which is driven by the gear 57 constantly driven by a pinion 58 fixed upon the shaft 3. The gear 57 intermittently operates the shaft 56 through the intermediation of any suitable clutch which may have the general construction illustrated in Figs. 17, 18 and 19 which show another clutch, operating reversely to the first clutch, and itself fully described herein. The clutch shown in these latter figures includes an internally toothed collar 105 integrally formed with the gear wheel 30. The shaft 106 is not in fixed connection with said collar and gear wheel but may be brought into fixed connection therewith by means of the driving dog 61 carried upon the clutch member 59 and pressed into engagement with some tooth on the collar 105 by a spring 62 which is anchored at one end to a collar 63 in fixed connection with the shaft 106. The driving dog structure 61 has a foot portion 104 that projects beyond the collar 105. Referring now to the clutch associated with shaft 56, a trip dog shaft 65, journaled to oscillate upon its axis, is provided with a downwardly extended portion the lower end of which is articulated with a slide bar 66, as best seen in Figure 12. The slide bar 66 is normally supported in the path of the foot portion 64 of the driving dog 61 (similar to portion 104 of the other clutch but reversely placed with respect thereto), and when the foot portion 64 of the driving dog 61 engages the sliding bar 66 the dog is disengaged from the collar 60 against the force of the spring 62. When the shaft 65 is oscillated to withdraw the slide bar 66 out of the path of the foot portion 64 of the driving dog 61, the spring 62 then forces the driving dog 61 into engagement with some tooth on the notched collar 60, thus establishing a driving connection between the gear 57 and the shaft 56 of the means that supplies bundles to the shock forming receptacle.

The rod 65 carries two arms 67 which are engaged by the first bundle placed upon the receiving deck when the second bundle placed upon the receiving deck moves this first bundle against said arms, to release the dog, thus coupling the shaft 56 to gear 57, which causes the shaft 56 to be driven, thus moving the lever 48 to disconnect the clutch 42, 43. When the shaft 56 is coupled with the gear 57 the cam disc 46 is rotated to separate the clutch member 42 from the clutch member 43 thereby to stop said arms 11 from operating. This latter condition lasts during the time that the receiving deck 10 is moving from and returning to its bundle receiving position, during which period of time the cam disc 46 and the shaft 56 carrying it, make one complete turn, the clutch 43 being restored to normal position in engagement with the clutch member 42 when the said cam disc completes its revolution, that is when the receiving deck 10 is again in bundle receiving position.

After the quota of bundles, in this instance consisting of two, has been placed upon the receiving deck 10, this deck is moved to a discharging position such as that illustrated by dotted lines in Fig. 2 at the upper part of the figure or such other position as will be sufficient to effect the discharge of the bundles to the receptacle where the bundles are to be tied into a shock. The movement of the receiving deck 10 is accomplished, as hitherto set forth, by the elevation of the pronged structure 14, 15 whose prongs first enter the bundles to hold them in relation to the deck, the pronged structure and the deck thereafter moving as a unit until the discharge of the bundles from the deck is effected. The prong structure carries the deck at 17 and is itself carried upon the shaft 16. The shaft 16 is surrounded by two coiled springs 68, 69, one end of each spring being in engagement with the shaft and the other end with the frame of the machine. These springs exert torque upon the shaft in opposite directions to cushion the bundle discharging and returning movements of the receiving deck 10 and the pronged structure accompanying the same. The shaft 16 is intermittently turned to impart discharging and restoring movements to the bundle receiving deck by means of the intermittently rotated shaft 56 which carries a crank 70 for this purpose. A pitman 71 connects this crank with the oscillating segmental rack 72 that is in mesh with the pinion 73 fixed upon the shaft 16. Whenever the shaft 56 is turned the rack 72 will be oscillated to impart the aforesaid movements to the shaft 16 to bring the bundle receiving deck to bundle discharging position and to restore the same to bundle receiving position.

The shocker needle 23 is presented to the knotting mechanism 24 after the number of bundles that are to be included in a shock have been deposited in the receptacle. I employ trip mechanism to determine the time that the shocker needle will operate. This trip mechanism includes a bevelled gear 74 which is in mesh with the bevelled gear 41 fixed upon the shaft 3. The shaft 75 carrying the bevelled gear 74 also carries a sprocket pinion 76 which drives the sprocket chain 77 that in turn drives the sprocket wheel 78, the movement of all of these parts being constant. The sprocket wheel 78 is upon a collar 79, this collar being a part of the clutch that functions similarly to the collar 60 shown in Figs. 17, 18 and 19. The hub of the crank 80 is in fixed connection with the shaft 81 and has a dog connected therewith similar to the dog 61 whereby this shaft 81 may be coupled with the collar 79. This dog has a foot 82 similar in function to the foot 64 but inverted in position as compared with the foot 64. A bell crank 83 is journaled upon the shaft 84. One arm 85 of the bell crank is engaged by a leaf spring 86 which functions to place the other bell crank arm 87 in engagement with the foot 82 normally to uncouple the shaft 81 and the collar 79 whereby said shaft 81 is normally stationary. Each time the bell crank is disengaged from the foot 82 the collar 79 is coupled with the shaft 81 and, as the sprocket 78 is in fixed relation to the collar 79, said sprocket, which constantly rotates, is at this time coupled with the shaft 81 to drive the same. When the shaft 81 is turned the crank 80 is operated and this crank, through the pitman 88, swings the arm 89 upon its stub shaft 90. A segmental rack 91 is carried upon the arm 89 on the upper side of the stub shaft 90 and is in mesh with the segmental pinion 92.

The operation of the crank 80 causes the operation of the segmental rack 91 whereby the shocker needle 23 is presented to the knotting mechanism 24, a result which is timed to occur after the full complement of bundles for a given shock has been accumulated in the bundle receiving receptacle. This movement of the shocker needle occurs when the receiving deck 10 and the pronged structure 14, 15 have passed the vertical position on their return movement. The bell crank arm 87 is tripped from engagement with the foot 82 in order to start the operation of the shocker needle by means of one or the other of the tripping arms 93. These tripping arms are fixed upon the shaft 94 which carries a worm wheel 95 in mesh with a worm 96 fixed upon the shaft 56. Each time the shaft 56 is turned, in the manner heretofore set forth, the shaft 94 is given an eighth of a turn, eight bundles of a shock being deposited upon each half revolution of the shaft 94, two for each eighth of a turn. In the concluding part of each half revolution of the shaft 94 one or the other of the arms 93 engages the bell crank arm 85 to depress it against the force of the spring 86 to withdraw the bell crank arm 87 from engagement with the dog foot 82 whereupon the shocker needle 23 is presented to the knotter 24. When the needle is presented to the knotter, the knotter is operated by the sprocket chain 97 which in turn is operated by the sprocket gear 98 mounted upon the shaft 81. After the shock has been tied the swinging bottom section 25 is moved to the rear to discharge the shock. This operation is governed by the intermittently rotated shaft 81 through the intermediation of an arm 99 and pin 100 on this arm as shown in Fig. 13. This pin engages a rocker bar 101 which is held within the circle of rotation of the pin 100 by a spring 102. The lower end of the rocker arm 101 is articulated with an angular slide bar 103. The spring 102 normally positions the slide bar 103 to have this bar engage the upper face of the foot 104 of a driving dog that forms a part of the clutch mechanism shown in Figs. 17, 18 and 19, as hitherto described. The gear 30, being constantly rotated by the gear 57, is in fixed connection with the collar 105. Normally the shaft 81 is idle and in position to permit the spring 102 to hold the slide bar 103 in engagement with the driving dog foot 104 but when the shaft 81 is turned it will, through the mechanism described, withdraw the slide bar 103 from engagement with the driving dog foot 104 whereupon the shaft 106 is coupled with the gear 30. This shaft carries the crank 29 which is connected by the pitman 28 with the arm 26 that is in fixed connection with the swinging bottom section 25. When the gear 30 is thus coupled with the shaft 106 the swinging bottom section 25 is moved to the rear to discharge the shock, as hitherto set forth, a result which occurs after eight bundles have been accumulated and tied in the carrier (assuming that eight bundles are to be included in each shock).

The wheels 6 and 7 that support the shocker turn upon the horizontal branches 107 of knuckle shafts. These knuckle shafts are provided with upright sleeves 108 which surround rotatable shafts 109. The lower ends of these shafts carry worms 111 engaging upright racks 112 upon the knuckle shafts. By these means the shocker frame may be raised and lowered in accordance with the level of the harvester. The shafts 107 together with the wheels thereon are individually rotatable upon the upright shafts 109. The shafts 107 are caused to move in unison about the shafts 109 by means of the coupling rod 113 joining the arms 114 that project from the knuckle shafts. The rod 113 is formed in sections joined by the link 115 which is in fixed connection with one of these rod sections and in telescoping engagement with the other of these sections whereby the effective length of said rod may be altered. The normal length of the rod is adjustably determined by the nuts 116 upon the threaded end of one of the sections of said rod, this being the end which is preferably in telescoping connection with the link 115. When the shocker rounds very sharp turns one of the sections of the rod 113 is moved toward the other to prevent the inside wheel from digging the ground and to avoid breakage.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with the binder deck of a harvester provided with mechanism for discharging bundles of grain therefrom; of a shocker having a deck for receiving the bundles from the binder deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; a receptacle for receiving the bundles discharged from said receiving deck; mechanism for tying the bundles in said receptacle into a shock; and mechanism for discharging the shock from the receptacle.

2. The combination with the binder deck of a harvester provided with mechanism for discharging bundles of grain therefrom; of a shocker having a deck for receiving the bundles from the binder deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure toward said receiving deck to engage said pronged structure with the bundles thereon and turning said pronged structure and receiving deck together to an inverted position thereof to discharge the bundles therefrom; a receptacle for receiving the bundles discharged from said receiving deck; mechanism for tying the bundles in said receptacle into a shock; and mechanism for discharging the shock from the receptacle.

3. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; a receptacle for receiving the bundles discharged from said receiving deck; mechanism for tying the bundles in said receptacle into a shock; and mechanism for discharging the shock from the receptacle.

4. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure toward said receiving deck to engage said pronged structure with the bundles thereon and turning said pronged structure and receiving deck together to an inverted position thereof to discharge the bundles therefrom; a receptacle for receiving the bundles discharged from said receiving deck; mechanism for tying the bundles in said receptacle into a shock; and mechanism for discharging the shock from the receptacle.

5. The combination with a binder deck of a harvester provided with mechanism for discharging bundles of grain therefrom; of a shocker having a deck for receiving the bundles from the binder deck; an arm structure for engaging the bundles to effect the transfer thereof from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; a receptacle for receiving the bundles discharged from said receiving deck; mechanism for tying the bundles in said receptacle into a shock; and mechanism for discharging the shock from the receptacle.

6. The combination with a binder deck of a harvester provided with mechanism for discharging bundles of grain therefrom; of a shocker having a deck for receiving the bundles from the binder deck; an arm structure for engaging the bundles to effect the transfer thereof from the binder deck to said receiving deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure with the bundles thereon and turning said pronged structure and receiving deck together to an inverted position thereof to discharge the bundles therefrom; a receptacle for receiving the bundles discharged from said receiving deck; mechanism for tying the bundles in said receptacle into a shock; and mechanism for discharging the shock from the receptacle.

7. The combination with the binder deck of a harvester provided with mechanism for discharging bundles of grain therefrom; of a shocker having a deck for receiving the bundles from the binder deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; governing mechanism causing the transfer of a plurality of bundles to said receiving deck previous to each discharging movement of this deck; a receptacle for receiving bundles deposited thereon on a plurality of discharging movements of said receiving deck; mechanism for tying the bundles in said receptacle into a shock; and mechanism for discharging the shock from the receptacle.

8. The combination with the binder deck of a harvester provided with mechanism for discharging bundles of grain therefrom; of a shocker having a deck for receiving the bundles from the binder deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure toward said receiving deck to engage said pronged structure with the bundles thereon and turning said pronged structure and receiving deck together to an inverted position thereof to discharge the bundles therefrom; governing mechanism causing the transfer of a plurality of bundles to said receiving deck previous to each discharging movement of the deck; a receptacle for receiving bundles deposited thereon on a plurality of discharging movements of said receiving deck; mechanism for tying the bundles in said receptacle into a shock; and mechanism for discharging the shock from the receptacle.

9. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; governing mechanism causing the transfer of a plurality of bundles to said receiving deck previous to each discharging movement of the deck; a receptacle for receiving bundles deposited thereon on a plurality of discharging movements of said receiving deck; mechanism for tying the bundles in said receptacle into a shock; and mechanism for discharging the shock from the receptacle.

10. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck; a pronged structure for engaging bundles upon said receiving deck and located out of the range of the movement of bundles of passing to said receiving deck, said pronged structure and receiving deck being one in swinging connection with the other and together swingingly supported; mechanism for moving said pronged structure toward said receiving deck to engage said pronged structure with the bundles thereon and turning said pronged structure and receiving deck together to an inverted position thereof to discharge the bundles therefrom; governing mechanism causing the transfer of a plurality of bundles to said receiving deck previous to each discharging movement of the deck; a receptacle for receiving bundles deposited thereon on a plurality of discharging movements of said receiving deck; mechanism for tying the bundles in said receptacle into a shock; and mechanism for discharging the shock from the receptacle.

11. The combination with a binder deck of a harvester provided with mechanism for discharging bundles of grain therefrom; of a shocker having a deck for receiving the bundles from the binder deck, an arm structure for engaging the bundles to effect the transfer thereof from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; governing mechanism causing the transfer of a plurality of bundles to said receiving deck previous to each discharging movement of the deck; a receptacle for receiving bundles deposited thereon on a plurality of discharging movements of said receiving deck; mechanism for tying the bundles in said receptacle into a shock; and mechanism for discharging the shock from the receptacle.

12. The combination with a binder deck of a harvester provided with mechanism for discharging bundles of grain therefrom; of a shocker having a deck for receiving the bundles from the binder deck; an arm structure for engaging the bundles to effect the transfer thereof from the binder deck to said receiving deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure with the bundles thereon and turning said pronged structure and receiving deck together to an inverted position thereof to discharge the bundles therefrom; governing mechanism causing the transfer of a plurality of bundles to said receiving deck previous to each discharging movement of the deck; a receptacle for receiving bundles deposited thereon on a plurality of discharging movements of said receiving deck; mechanism for tying the bundles in said receptacle into a shock; and mechanism for discharging the shock from the receptacle.

13. The combination with the binder deck of a harvester provided with mechanism for discharging bundles of grain therefrom; of a shocker having a shock former and a deck for receiving the bundles from the binder deck; mechanism for effecting the transfer of the bundles of grain from the binder deck to said receiving deck; means for transferring the bundles from the receiving deck to the shock former; mechanism for tying a plurality of bundles into a shock; and mechanism for effecting the discharge of the shock.

14. The combination with a binder deck of a harvester provided with mechanism for discharging bundles of grain therefrom; of a shocker having a shock former and a deck for receiving the bundles from the binder deck; an arm structure for engaging the bundles to effect the transfer thereof from the binder deck to said receiving deck; means for transferring the bundles from the receiving deck to the shock former; mechanism for tying a plurality of bundles into a shock; and mechanism for effecting the discharge of the shock.

15. The combination with the binder deck of a harvester provided with mechanism for discharging bundles of grain therefrom; of a shocker having a deck for receiving the bundles from the binder deck; mechanism for moving said receiving deck to an inverted position thereof to discharge the bundles therefrom; a gate interposed between said decks; means for depressing said gate when the receiving deck is in receiving position and for raising said gate when the receiving deck is moved from its receiving position; a receptacle for receiving bundles from the receiving deck; mechanism for tying the bundles in said receptacle into a shock; and mechanism for discharging the shock from the receptacle.

16. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; mechanism for stopping the operation of said transfer mechanism when said receiving deck is in movement; a receptacle for receiving bundles from the receiving deck; mechanism for tying the bundles in said receptacle into a shock; and mechanism for discharging the shock from the receptacle.

17. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure toward receiving deck to engage said pronged structure with the bundles thereon and turning said pronged structure and receiving deck together to an inverted position thereof to discharge the bundles therefrom; mechanism for stopping the operation of said transfer mechanism when said receiving deck is in movement; a receptacle for receiving bundles from the receiving deck to form a shock; mechanism for tying the shock; and mechanism for discharging the shock from the receptacle.

18. The combination with a binder deck of a harvester provided with mechanism for discharging bundles of grain therefrom; of a shocker having a deck for receiving the bundles from the binder deck; an arm structure for engaging the bundles to effect the transfer thereof from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; mechanism for stopping the operation of said arm structure when said receiving deck is in movement; a receptacle for receiving bundles from the receiving deck to form a shock; mechanism for tying the shock; and mechanism for discharging the shock from the receptacle.

19. The combination with a binder deck of a harvester provided with mechanism for discharging bundles of grain therefrom; of a shocker having a deck for receiving the bundles from the binder deck; an arm structure for engaging the bundles to effect the transfer thereof from the binder deck to said receiving deck; a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure with the bundles thereon and turning said pronged structure and receiving deck together to an inverted position thereof to discharge the bundles therefrom; mechanism for stopping the operation of said arm structure when said receiving deck is in movement; a receptacle for receiving bundles from the receiving deck to form a shock; mechanism for tying the shock; and mechanism for discharging the shock from the receptacle.

20. The combination with the binder deck of a harvester provided with mechanism for discharging bundles of grain therefrom; of a shocker having a deck for receiving the bundles from the binder deck; mechanism for moving said receiving deck to an inverted position thereof to discharge the bundles therefrom; a gate interposed between said decks and engaged by a part moving with the receiving deck to be depressed thereby when the receiving deck is in bundle receiving position; means for raising the gate when the receiving deck is moved from its receiving position; a receptacle for receiving bundles from the receiving deck to form a shock; mechanism for tying the shock; and mechanism for discharging the shock from the receptacle.

21. The combination with the binder deck of a harvester provided with mechanism for discharging bundles of grain therefrom; of a shocker having a deck for receiving the bundles from the binder deck; a pronged structure for engaging bundles upon said receiving deck and located out of the range of the movement of bundles passing to said receiving deck; mechanism for moving said pronged structure with respect to and into the bundles upon the receiving deck and moving said pronged structure and deck together to a discharging position thereof; a receptacle for receiving bundles from the receiving deck to form a shock; mechanism for tying the shock; and mechanism for discharging the shock from the receptacle.

22. The combination with the binder deck of a harvester provided with mechanism for discharging bundles of grain therefrom; of a shocker having a deck for receiving the bundles from the binder deck; mechanism for effecting the transfer of the bundles of grain from the binder deck to said receiving deck, a pronged structure for engaging bundles upon said receiving deck and located out of the range of the movement of bundles passing to said receiving deck, said pronged structure and receiving deck being one in swinging connection with the other and together swingingly supported; mechanism for moving said pronged structure toward said receiving deck to engage said pronged structure with the bundles thereon and turning said pronged structure and receiving deck together to an inverted position thereof to discharge the bundles therefrom; mechanism for stopping the operation of said transfer mechanism when said receiving deck is in movement; a receptacle for receiving bundles from the receiving deck to form a shock; mechanism for tying the shock; mechanism for discharging the shock from the receptacle; a gate interposed between the receiving and binder decks; and means for depressing said gate below the plane of the receiving deck when the latter is in receiving position, and projecting the gate above said plane when the receiving deck is moved from its receiving position.

23. The combination with a binder deck of a harvester provided with mechanism for discharging bundles of grain therefrom; of a shocker having a deck for receiving the bundles from the binder deck; an arm structure for engaging the bundles to effect the transfer thereof from the binder deck to said receiving deck; a pronged structure for engaging bundles upon said receiving deck and located out of the range of the movement of bundles passing to said receiving deck; mechanism for moving said pronged structure toward said receiving deck to engage said pronged structure with the bundles thereon and moving said pronged structure and receiving deck together to an inverted position thereof to discharge the bundles therefrom; mechanism for stopping the operation of said arm structure when said receiving deck is in movement; a receptacle for receiving bundles from the receiving deck to form a shock; mechanism for tying the shock; mechanism for discharging the shock from the receptacle; a gate interposed between the receiving and binder decks; and means for depressing said gate below the plane of the receiving deck when the latter is in receiving position, and projecting the gate above said plane when the receiving deck is moved from its receiving position.

24. In combination with a grain binder having bundle discharging mechanism; a shocker having a receptacle for bundles to form a shock; and an oscillating member adapted to receive the bundles discharged from the binder and deposit them in said receptacle; bundle supporting means beyond the limit of travel of the binder bundle discharging mechanism and at one side of the path of travel of said oscillating member; and intermittently operating mechanism for moving the supported bundles relatively to and while on said supporting means into the path of travel of said oscillating member.

25. The combination with a bundle binder having discharge mechanism; of a shocker including a receptacle and means for supplying bundles thereto; and support them at one side of the path of said bundle supplying means and intermittently operated mechanism, additional to the binder, for transferring bundles on and across said deck into the path of travel of said bundle supplying means.

26. The combination with a harvester binder; of a shocker having a shock former and an oscillating member operating to deliver into the shock former bundles discharged from the binder; mechanism for transferring to said member bundles discharged from the binder; and means actuated by pressure applied by said transferring mechanism through a bundle transferred thereby to the path of said oscillating member for causing said oscillating member to function to deliver the bundle and said transferring mechanism to cease functioning.

27. The combination with a grain binder having bundle discharging mechanism; of a shocker having a receptacle for bundles discharged from the binder to form a shock and an oscillating delivery member adapted to receive bundles and to deposit them in said receptacle; stationary bundle supporting means beyond the limit of travel of the binder discharging mechanism and at one side of the path of travel of the oscillating delivery member; and intermittently acting mechanism for effecting the transfer of bundles across said bundle supporting means into the path of travel of the oscillating delivery member.

28. The combination with the binder deck of a harvester provided with mechanism for discharging bundles of grain therefrom; of a shocker having a receptacle adapted to receive bundles discharged from the binder deck; a supplemental deck supported on the shocker to receive the bundles in transit from the binder deck to the receptacle; mechanism for effecting the transfer of the bundles from the supplemental deck toward said receptacle; mechanism operating to deposit the bundles in said receptacle butt ends rearwardly to form a shock; and mechanism for effecting the discharge of the shock from said receptacle.

29. The combination with a binder deck of a harvester provided with mechanism for discharging bundles of grain therefrom; of a shocker having a receptacle adapted to receive bundles discharged from the binder deck; a supplemental deck supported on the shocker adjacent the binder deck to receive the bundles in transit from the binder deck to said receptacle; intermittently operating mechanism for effecting the transfer of the bundles from the supplemental deck; mechanism adapted to receive the bundles from the supplemental deck and operating to deposit them in said receptacle butt ends rearwardly to form a shock; and mechanism for effecting the discharge of the shock from said receptacle.

30. The combination with the binder deck of a harvester provided with mechanism for discharging bundles of grain therefrom; of a shocker having a deck for receiving the bundles from the binder deck; a supplemental deck supported on the shocker and located between the binder deck and the receiving deck to receive the bundles in transit from the binder deck to the receiving deck; an intermittently operating arm structure for effecting the transfer of the bundles from the supplemental deck to the receiving deck; a receptacle for receiving bundles from the receiving deck; mechanism operating to deposit the bundles in said receptacle butt ends rearwardly to form a shock; and mechanism for effecting the discharge of the shock from said receptacle.

31. The combination with the binder deck of a harvester provided with mechanism for discharging bundles of grain therefrom; of a shocker having a receptacle for bundles discharged from the binder deck and mechanism for depositing the bundles in said receptacle to form a shock; means between the binder deck and said depositing mechanism operating to effect the transfer of bundles from the binder deck to said depositing mechanism; and means for intercepting the bundles to prevent said transfer when said depositing mechanism is in operation.

32. The combination with the binder deck of a harvester provided with mechanism for discharging bundles of grain therefrom; of a shocker having a receptacle for bundles discharged from the binder deck and mechanism for depositing the bundles in said receptacle to form a shock; means between the binder deck and said depositing mechanism operating intermittently to effect the transfer of bundles from the binder deck to said depositing mechanism; and means for intercepting the bundles to prevent said transfer when said depositing mechanism is in operation.

33. The combination with the binder deck of a harvester provided with mechanism for discharging bundles therefrom; of a shocker having a receptacle for bundles discharged from the binder deck, a pronged structure to receive bundles from the binder deck and mechanism to actuate said pronged structure to deposit bundles in said receptacle to form a shock; means automatically operating intermediate the binder discharge mechanism and said pronged structure to intercept and prevent the passage of bundles from the binder deck to said pronged structure when the latter is actuated and to permit the passage of bundles from the binder deck to said pronged structure when the latter is in receiving position.

34. The combination with the binder deck of a harvester provided with mechanism for discharging bundles therefrom; of a shocker having a receptacle for bundles, a pronged structure to receive bundles discharged from the binder deck and mechanism to actuate said pronged structure to deposit bundles in said receptacle to form a shock; mechanism between the binder deck and said pronged structure operating to effect the transfer of bundles from the binder deck to said structure; and means automatically actuated to intercept and prevent the passage of bundles to said structure when the latter is operated and to permit the passage of bundles to said structure when the latter is in receiving position.

35. The combination with the binder deck of a harvester provided with mechanism for discharging bundles of grain therefrom; of a shocker having a receptacle for bundles discharged from the binder deck and an oscillating pronged structure to receive the bundles and operating to deposit them in said receptacle to form a shock; mechanism between the binder deck and said pronged structure operating intermittently to effect the transfer of bundles to said pronged structure; tripping mechanism adapted to be operated by the action of said intermittent transferring mechanism for releasing said pronged structure to engage the bundles transferred into its path of movement; mechanism for tying the shock normally held inactive and released by operation of said pronged structure mechanism; and shock discharging mechanism held inoperative while the shock is forming and released to discharge the shock by operation of the shock tying mechanism.

36. The combination with bundle forming and discharging mechanism; of a shock; and intermittently operating mechanism for transferring bundles from the bundle forming mechanism to the shocker, said shocker including a bundle shifting arm serving to engage the bundles discharged from the bundle forming and discharging mechanism and having arm actuating means governed by pressure applied by said intermittently operating mechanism through a bundle moved by said intermittently operating mechanism.

37. The combination with a bundle binder; of a shocker; and intermittently operating mechanism for transferring bundles from the binder to the shocker, said shocker including a bundle shifting arm serving to engage the bundles discharged from the binder and having arm actuating means governed by said intermittently operating mechanism and made effective by a plurality of bundles transferred by said intermittently operating mechanism.

38. The combination with bundle forming and discharging mechanism; of a shocker; and intermittently operating mechanism for transferring bundles from the bundle forming mechanism to the shocker, said shocker including a bundle shifting arm serving to engage the bundles discharged from the bundle forming and discharging mechanism and having arm actuating means governed by said intermittently operating mechanism and made effective by a plurality of bundles transferred by said intermittently operating mechanism.

39. The combination with bundle forming and delivering mechanism; of a shocker; intermittently operating mechanism for transferring bundles from the bundle forming mechanism to the shocker, the shocker including an oscillating bundle shifting means operating upon the bundles delivered from the bundle forming mechanism; and means for making the bundle shifting means effective upon the transfer of a plurality of bundles to the shocker.

40. The combination with bundle forming and delivering mechanism; of a shocker; intermittently operating mechanism for transferring bundles from the bundle forming mechanism to the shocker, the shocker including a bundle shifting means operating upon the bundles delivered from the bundle forming mechanism; and means for making the bundle shifting means effective upon the transfer of a plurality of bundles to the shocker.

41. The combination with a bundle binder; of a shocker; and intermittently operating mechanism for transferring bundles from the binder to the shocker, said shocker including a bundle shifting arm serving to engage the bundles discharged from the binder and having arm actuating means governed by said intermittently operating mechanism and made effective upon the transfer of a plurality of bundles to the shocker.

42. The combination with bundle forming and discharging mechanism; of a shocker; and intermittently operating mechanism for transferring bundles from the bundle forming mechanism to the shocker, said shocker including a bundle shifting arm serving to engage the bundles discharged from the bundle forming and discharging mechanism and having arm actuating means governed by said intermittently operating mechanism and made effective upon the transfer of a plurality of bundles to the shocker.

43. The combination with bundle forming and discharging mechanism; of a shocker; and intermittently operating mechanism for transferring bundles from the bundle forming mechanism to the shocker, said shocker including a bundle shifting arm serving to engage the bundles discharged from the bundle forming and discharging mechanism and having arm actuating means governed by said intermittently operating mechanism and made effective by the intermittently operating mechanism upon the transfer of a plurality of bundles by this intermittently operating mechanism.

44. The combination with a bundle binder; of a shocker having bundle shifting mechanism; mechanism for effecting the transfer of bundles from the binder to said bundle shifting mechanism; and bundle intercepting means for preventing said transfer when the bundle shifting mechanism is in operation.

45. The combination with a bundle binder; of a shocker having bundle shifting mechanism; mechanism for effecting the transfer of bundles from the binder to said bundle shifting mechanism; an obstruction for preventing said transfer; and mechanism for moving the obstruction into the path of the bundle when the bundle shifting mechanism is in operation and thereafter withdrawing said obstruction from such path.

46. The combination with a bundle binder; of a grain shocker having a bundle receptacle and oscillating means for delivering bundles to said receptacle; bundle transferring equipment inclusive of a bundle support between said binder and said oscillating means and bundle transferring mechanism; for moving bundles discharged by said bundle binder on and across the support into the path traveled by said oscillating means; a source of power common to the oscillating means and transferring mechanism; a clutch through which power is transmitted to said transferring mechanism from said common source of power; and means for opening said clutch to disconnect the bundle transferring mechanism from the common source of power while the oscillating means is operating.

In witness whereof, I hereunto subscribe my name this 2nd day of May, A. D. 1919.

CARLTON C. KELLOGG.